US012673790B2

(12) United States Patent
    Peeters

(10) Patent No.: US 12,673,790 B2
(45) Date of Patent: Jul. 7, 2026

(54) PROPULSION SYSTEM FOR MULTICOPTERS AND RELATED AIRCRAFTS

(71) Applicant: KJI DRONELAB BV, Sint-Niklaas (BE)

(72) Inventor: Ivan Peeters, Beveren (BE)

(73) Assignee: KJI DRONELAB BV, Sint-Niklaas (BE)

( * ) Notice: Subject to any disclaimer, the term of this patent is extended or adjusted under 35 U.S.C. 154(b) by 0 days.

(21) Appl. No.: 19/110,231

(22) PCT Filed: Sep. 15, 2023

(86) PCT No.: PCT/EP2023/075445
    § 371 (c)(1),
    (2) Date: Mar. 10, 2025

(87) PCT Pub. No.: WO2024/056866
    PCT Pub. Date: Mar. 21, 2024

(65) Prior Publication Data
    US 2026/0091894 A1      Apr. 2, 2026

(30) Foreign Application Priority Data
    Sep. 16, 2022    (WO) ................. PCT/EP2022/075837

(51) Int. Cl.
    *B64U 50/13*      (2023.01)
    *B64U 10/14*      (2023.01)
(52) U.S. Cl.
    CPC ............. *B64U 50/13* (2023.01); *B64U 10/14* (2023.01)

(58) Field of Classification Search
    CPC ................................ B64U 50/13; B64U 10/14
    See application file for complete search history.

(56)                References Cited

U.S. PATENT DOCUMENTS 5,516,060  A  *  5/1996  McDonnell ............. B64C 29/02
                                                    244/23 B
    2010/0301168  A1   12/2010  Raposo
    2012/0032032  A1    2/2012  De Roche
    2018/0194463  A1    7/2018  Hasinski et al.
    2019/0033932  A1    1/2019  Ku et al.
    2020/0031458  A1*   1/2020  Strauss .................. B64U 30/12

FOREIGN PATENT DOCUMENTS

CN       112660366  A      4/2021
    CN       113978712  A      1/2022
    JP       2019123486  A      7/2019
    WO       2020253614  A1    12/2020

OTHER PUBLICATIONS

WIPO, International Search Report issued for PCT/EP2023/ 075445, Nov. 6, 2023.

* cited by examiner

*Primary Examiner* — Valentina Xavier
(74) *Attorney, Agent, or Firm* — Hodgson Russ LLP

(57)                ABSTRACT

The present invention concerns a device for a multicopter that allows the multicopter to move without tipping over. This device generates propulsion according to the x- and/or Y-axis using the air displacement of the drive propellers and/or an additional drive device.

16 Claims, 8 Drawing Sheets

PROPULSION SYSTEM FOR MULTICOPTERS AND RELATED AIRCRAFTS

TECHNICAL FIELD

The invention relates to an improved aerial vehicle, and particularly an improved drone or multicopter, with an increased mobility and positional control. These devices aim to land at landing sites that have been indicated and within a certain tolerance. Various techniques have already been described in which one tries to position the multicopter very accurately when landing, such as in applications for docking a multicopter on, for example, a van in order to exchange packages or for connecting the multicopter in an autonomous way to a charging station. Additionally, the invention is aimed at situations where on-the-fly, highly accurate positioning is required.

STATE OF THE ART

Techniques have already been described for adjusting the position of a multicopter in a preferably horizontal way by using propellers that make corrections and work on top of the existing driveline of the multicopter.

For example, the US patent with publication number US2010/0301168 A1 relates to a propulsion system for vertical take-off and landing aircraft or vehicles capable of moving in any fluid or vacuum. More specifically, it refers to a method of propulsion control of the vector drive that allows independent movement with six degrees of freedom, i.e., three degrees of translation relative to its center of mass or gravity and three degrees of rotation relative to its center of mass. The displacement capability of the aircraft using the propulsion system of the present invention depends on two main propellers or propellers and which can be tilted around the pitch by means of tilting mechanisms and, used to perform a forward or backward movement, can be roller shaft by means of tilting mechanisms and, used to perform lateral movements to the right or the left and to perform upward or downward movements (Z), where the main screws are further used to perform rotations around the vehicle's vulture shaft (Z) and around the roller (X). The propulsion function also uses one or two auxiliary screws or propellers and mainly controls the rotation around the emergency shaft. These thrusters or propellers and are attached to or near the longitudinal direction of the vehicle, with their thrust perpendicular or almost perpendicular to the rolling and thru-axle of the vehicle For example, there are alternative methods that describe propellers that can be placed at a certain angle to give the multicopter or the UAV in general, more stability. Some of these techniques are described in the patents with publication numbers US2018194463, US2012032032 and JP2019123486.

However, none of the techniques currently described offer this invention's technical solution. The advantage of the present invention is to be able to adjust the multicopter without influence or with minimal influence on the primary drive of the multicopter in such a way that the multicopter retains its horizontal position. In addition, the components to achieve this control are reduced to a minimum, which is crucial for multicopters and aviation vehicles in general.

An additional disadvantage of the current state of the art in multicopters is that it is still challenging to control a multicopter for non-professional pilots or with limited experience. However, the present invention offers the advantage that the multicopter is much easier to handle at lower speeds.

SUMMARY

The current invention aims to provide a solution to the disadvantages mentioned above and other disadvantages linked to the specifications of the current multicopters. However, it should be noted that the present invention is not restricted to multicopters per se. In what follows, the term "multicopter" should be interpreted as a general term that covers drones with rotary propulsion systems. In the application, particular reference is often made to quadcopters as a specifically preferred embodiment, but again, the invention is not restricted solely to quadcopters and can be applied to all types of drones with rotary propulsion systems.

To this end, the invention aims to make a multicopter with at least four drive devices (as mentioned, fewer drive devices are possible as well), such as propellers that move horizontally without tilting the multicopter. To achieve this, the multicopter is equipped with an additional drive device preferably placed centrally on the multicopter. This drive system provides a control airflow that can make the multicopter move mainly according to the x- and/or y-axis; depending on the application and version, this can be supplemented with the z-axis. Furthermore, depending on the specific application of this invention's technique, the multicopter can be adjusted during landing, making it possible to land very accurately in a specific place. But it can also be used for smooth movement in smaller spaces where substantial control over the multicopter is necessary. An application of this can be a quadcopter as reconnaissance, surveillance, or inspection drone.

The control air flows can be produced in the following way:

part of the displaced air from the drive propellers is diverted one or more propellers are additionally provided and work next to the drive propellers, a pressure chamber that may be centrally located is supplied with compressed air by, for example, a compressor. This compressed air can then be used as a control airflow.

any other existing technique that makes it possible to move air a combination of at least one of the preceding techniques The control airflow can possibly be used to move the multicopter according to the x- and/or y-axis, in some embodiments even rotate the multicopter around the Z-axis, and support and/or adjust the movement of the multicopter itself according to the z-axis. It is also possible that multiple air flows are produced simultaneously and used to actuate different effects (propulsion along several directions and/or rotation).

The applications for which the present invention may be able to offer a solution include without being exhaustive:

Multicopter for parcel deliveries where the multicopter lands on a docking station and the multicopter must be able to land very accurately to exchange the package with a Smartbox and/or lift installation.

Multicopter for e.g., inspections or reconnaissance trips where the multicopter can charge automatically via a docking station that is equipped with a recharging system that uses induction technology Multicopter for camera shots where it is crucial that the multicopter remains stable in the same location and where the multicopter has to perform slow to very slow movements in a controlled manner.

Multicopters for passenger transport

Any application where the multicopter must be able to land and/or maneuver very accurately.

An application in which the multicopter must be able to shoot a projectile such as a flare.

An application in which the multicopter must be able to apply counter pressure, such as a fire extinguisher.

A multicopter has at least four drive devices, such as propellers. For example, a quadcopter is a multicopter equipped with four propellers.

The operation of a quadcopter is explained below for support.

A quadcopter or quadrocopter is a helicopter driven by four propellers. It is a type of drone.

Unlike regular helicopters, the quadcopter uses symmetrically inclined blades. These can be switched in groups but not individually, given the position of the blades opposite the rotor disc. The construction of a quadcopter consists of a frame, four ESCs, four propellers and four (brushless) motors together with a control unit that ensures that the quadcopter remains stable.

This control unit controls the four ESCs (Electronic Speed controllers), which in turn control the four motors. Using a gyroscope and an accelerometer, the control unit will calculate the angle at which the quadcopter is tilted. It can then adjust the motors so that the quadcopter regains its balance.

The quadcopter must be controlled with a 4-channel remote control. This is necessary to be able to control the four possible movements of the quadcopter. Each of the four movements is controlled by a separate channel.

Pitching, rolling and yawing are the three dynamic movements that the quadcopter can make. As a fourth aspect, the height is set by adjusting the speed of the motors. The quadcopter works with four propellers, two of which rotate clockwise and two counterclockwise, resulting in the aircraft being very maneuverable. For example, a quadcopter can fly in + formation or in X formation. This is the direction in which the quadcopter flies relative to the propellers. The principle of the two formations is the same, only in the X-formation, two motors are used to perform one of the movements. With the + formation, only one engine is needed for this.

Because two motors rotate clockwise and two motors turn counterclockwise, an upward force is created. In addition, it is ensured that no spinning occurs. Because the direction in which the motors turn alternate, the moments of the motors are canceled out by each other. If each engine were to run at exactly the same speed, the quadcopter would have to fly straight up. Due to small deviations on each engine, a quadcopter does not fly in balance as standard. The control unit will adjust the motors to balance the quadcopter.

To get the quadcopter moving, there are four different options.

In order for the quadcopter to rise/fall, all four motors must be accelerated/slowed down at the same time. This causes the upward force from the engines to rise/fall.

For the quadcopter to rotate around its vertical axis, i.e., to yaw, the speed of two motors with the same direction of rotation must be increased. The torque on these motors is increased by this operation and thus provides a torque on the quadcopter so that the quadcopter will yaw.

In order for the quadcopter to move forward/backward or left/right in + formation, it is necessary that one motor runs faster than the other. This causes the quadcopter to tilt, so the force is distributed horizontally and vertically with the result that the quadcopter moves. In X-formation, on the other hand, two motors must be controlled simultaneously in order for the quadcopter to slope. By choosing the right motors, one can maneuver in all directions.

The technique used by today's multicopters thus implies that with any change in the horizontal position, the currently known multicopters must assume a certain angle in the horizontal position, which almost inevitably produces a fairly rough movement.

The moment the multicopter retakes a horizontal position, for example, the wind can cause it to deviate from its desired position, so it has to reposition itself again. This makes the accurate landing of a multicopter with the known techniques virtually impossible.

With the last generation of multicopters, and especially with the smaller versions of quadcopters, it is possible to move the multicopter in a very gentle and controlled way in a horizontal pattern. Because the multicopter still has to tilt to perform this movement, it is, therefore still very limited in its capabilities. Thus, performing this movement at a fairly large distance from the ground surface or other objects is necessary. The back pressure of the objects or ground surface exerts a major influence on the behavior of the multicopter. Also, the presence of wind, even to a slight degree, is a factor that can interfere excessively with this function. The ability to control the multicopter in a much softer and controlled manner is achieved in a software-based way and, therefore still brings about strength limitations. This technique does not make it possible to land the multicopter very accurately or to move smoothly while keeping the multicopter horizontal and still controlling it smoothly, even in smaller spaces.

The purpose of the present invention is to ensure that the multicopter, preferably but not limited to a quadcopter, can be corrected from the position in the x- and y-axis and possibly also adjusted in the z-direction.

We assume that the z-axis is the up and down movement of the multicopter and the x- and y-axes represent the lateral movements. In the following description, the x-axis represents a forward or backward movement and the y-axis represents a lateral movement of the multicopter.

The present extension provides for a device in which additional propulsion is provided in the x- and/or y-direction, possibly supplemented in the z-direction so that the multicopter can move laterally without making a tilting movement.

DESCRIPTION

The invention aims to make the multicopter move laterally by means of a controlled drive without tilting it. With current techniques, it is always necessary to have the multicopter make a minimal tilt to allow it to move.

Unless otherwise defined, all terms used in revealing the invention, including technical and scientific terms, have the meaning as generally understood by one skilled in the art for the field to which this invention belongs. Through further guidance, term definitions have been included to better appreciate the teachings of the present invention.

The terms multicopter, quadcopter, drones, and the like in the description and the claims are used to distinguish between similar aircrafts.

The terms "rotors" and "propellers" are used interchangeably.

The terms 'one or more' or 'at least one', such as one or more or at least one member(s) of a group of members, is necessarily clear. By further example, the term includes a reference to one of the said members or two or more of the said members.

All references cited in this specification are hereby incorporated in their entirety by reference. In particular, the doctrine of all references specifically referred to herein is to be incorporated by reference.

Unless otherwise defined, all terms used in revealing the invention, including technical and scientific terms, have the meaning as generally understood by one skilled in the art for the field to which this invention belongs. Through further guidance, definitions for the terms used in the description are included in the present invention's teachings. The terms or definitions used herein are given solely to assist in understanding the invention.

In addition, although some embodiments described herein include some, but not other features included in other versions, combinations of features of different versions are intended to fall within the scope of the invention and constitute various performances, as will be understood by the craftsman.

When using the x, y and z-axis as an indication, reference is made to an example where the multicopter is arranged horizontally. This refers to the x-direction as the forward or backward direction of the multicopter. The y-direction represents the transverse direction in the horizontal plane relative to the x-direction, which means that the multicopter moves sideways if it moves in the Y-direction. The z-axis is the transverse direction relative to the x-axis in the vertical plane.

The general principle of operation:

The technique described in the present invention makes it possible for the pilot of the multicopter to smoothly fly the multicopter according to the x- and/or y-direction and even in the z-direction without or with minimal tilt of the multicopter. By avoiding that the multicopter has to make a tilting motion to move according to the x- and/or y-direction, the multicopter does not make abrupt movements and is therefore much easier to operate, especially in circumstances where the movements of the multicopter require a lower speed. It can be claimed that the present invention ensures a smooth fine-tuning of the multicopter.

The present invention provides for a drive of the multicopter in two possible ways where there is the possibility that they are combined with each other.

In a first aspect, the invention relates to an aerial vehicle, unmanned, and preferably a multicopter, comprising a vehicle body, an optional landing gear attached to said vehicle body, one or more propulsions systems for moving the aerial vehicle, said propulsion systems comprising at least one rotor, and a processing unit, preferably comprised in the vehicle body, for controlling the propulsion systems.

The aerial vehicle, referred to as a multicopter hereafter without imposing any limitation, further comprises one or more corrective propulsion systems for providing directional impulses to the aerial vehicle during flight, said corrective propulsion systems comprising one or more hollow air ducts or airflow tubes. Said air ducts have an outlet aimed essentially laterally to the vehicle body, i.e., preferably aimed directly away from the center of mass of the aerial vehicle. The processing unit is adapted for controlling the corrective propulsion systems separately in order to emit a propulsive air stream from the outlet. Most preferably, the rotors of the propulsion systems are provided on the air ducts, although in some variations, the rotors are provided on suspension arms and the air ducts are separate components.

The directional impulses can be minor positional corrections but can also be used as a primary means of movement, at least in the horizontal plane.

By using a processing unit, very fast and accurate corrections or impulses can be provided, especially when using an independent means for generating the air flow such as a compressor. Each movable component in the system can be controlled and steered by the processing unit in order to successfully divert/guide the air flows in a desired path to create the necessary impulses.

In a preferred embodiment, each hollow air duct extends at least partly over a position directly below or above, preferably below, one or more of the rotors. The hollow air ducts comprise one or more openings at said position directly below or above, preferably below, one or more of the rotors at the side of the hollow air duct facing the rotor, said opening directed perpendicular to the plane wherein said rotor is configured to rotate, and wherein the processing unit is configured for allowing or disallowing an airflow to run from the opening out of the outlet.

In some variations, the air ducts are separate components and simply comprise an outlet for expelling the airflow, while the rotors are positioned on suspension arms which comprise the openings above which the rotors are positioned, with the suspension arms being at least partially hollow, in order to guide the airflow from the opening in the suspension arm, to the outlet of an air duct.

In a further preferred embodiment, at least one, and preferably each, air duct comprises two openings, a first opening more distal from the vehicle body than the rotor directly above or below the air duct, and a second opening more proximal to the vehicle body than the rotor directly above or below the air duct. Again, in some variations, the openings are present on the suspension arms on which the rotors are provided, with the air ducts being separate components in communication with said hollow suspension arms.

In a preferred embodiment, the openings can be closed via a closing mechanism that is controlled via the processing unit, for closing and opening the openings.

In a preferred embodiment, the hollow air ducts are provided with an internal closing mechanism, such as a valve, inside of the hollow air duct, said internal closing mechanism being controlled via the processing unit for closing and opening a passage from the opening to the outlet.

In a preferred embodiment, the corrective propulsion system comprises at least one movable flow director provided in each of the air ducts, said flow director movable along the longitudinal dimension of the air duct between a first position in between the opening of the air duct and the outlet of the air duct, and a second position not between the opening of the air duct and the outlet of the air duct, said second position preferably being more proximal to a center of the aerial vehicle, wherein said flow director is dimensioned to substantially seal the air duct internally at the position of said flow director. By doing so, it's possible to use the flow director to either block air flow to the outlet (by having the flow director past the opening towards the first position) or to allow air flow to the outlet (by having the flow direction towards the second position, more proximal to the center of the multicopter than the opening).

Alternatively, a valve can be used at a position between the opening and the outlet, and potentially a second valve at a position between the opening and the center of the multicopter, to control the air flow's direction.

In a further embodiment, flow directors of oppositely directed air ducts can be coupled, ensuring that the resulting effects therefrom are synergetic and do not counteract each other, such that movement of a first of said flow directors of said at least two air ducts towards the first position thereof is accompanied by movement of a second of said flow directors of said at least two air ducts towards the second position thereof and vice versa.

In a preferred embodiment, the airflow director comprises a ramped surface facing away from the outlet, said ramped surface ramping up towards the side of the air duct where the opening is positioned, ensuring a gentle trajectory for the control airflow, from and to the opening.

In a preferred embodiment, the corrective propulsion systems comprise an air compressor or any other type of air flow generating means, controlled by the processing unit, said air compressor being configured to generate an airflow through the hollow air ducts towards the outlet thereof, said compressor preferably being positioned centrally at the vehicle body. Systems using compressed air can generate more thrust, and are preferable as such.

In a preferred embodiment, the propulsion systems are positioned on the hollow air ducts.

In a preferred embodiment, the hollow air ducts are provided with deflector elements at the outlets thereof, said deflector elements being rotatable around an axis perpendicular to the longitudinal axis of the hollow air duct, and wherein the rotational position of the deflector elements is controllable via the processing unit.

In a possible embodiment, one or more of the hollow air ducts are rotatable in the horizontal plane of the aerial vehicle, said rotation being controlled by the processing unit.

In a preferred embodiment, the outlet of the air ducts is directed parallel to the plane wherein the (main) rotors are configured to rotate.

It should be noted that, in the present application, the main propulsion system for the vehicles are rotors which are positioned horizontally at most times, serving to provide a lifting force. In some variations, these vehicles comprise one or more additional propellers which may extend in a different, typically perpendicular plane to these main rotors, and serve to assist in lateral movements. In the text, when "rotors" or "propellers" are mentioned, the main rotors/propellers are referred to, unless explicitly indicated otherwise.

In a preferred embodiment, the air ducts comprise a secondary outlet, said secondary outlet being directed downward with respect to the vehicle body, away from the rotors (i.e., downwards), preferably wherein at least two or more, preferably all, of the air ducts converge to a central airflow tube at which central duct the secondary outlet of the ducts is positioned, most preferably wherein said central airflow tube is positioned below the center of the vehicle body.

In a preferred embodiment, the device comprises at least two rotation tubes for generating a rotational impulse to the aerial vehicle, each rotation tube with a rotation outlet extending in a direction parallel to the plane wherein the rotors are configured to rotate, and wherein said directions wherein the rotation outlets extend are positioned with an offset to an axis perpendicular to the plane wherein the rotors are configured to rotate, said axis through the center of mass of the aerial vehicle. The directions of the rotation tubes are directed in a different rotational direction with respect to said axis, whereby the processing unit is adapted for controlling the corrective propulsion systems separately in order to emit a rotationally propulsive air stream from one of the rotation outlets, preferably wherein said rotation outlets extend tangentially to a cylinder around said axis, facing clockwise and counterclockwise respectively with respect to said axis.

In a preferred embodiment, the air ducts are positioned in a plane parallel to the rotors with the outlets thereof being directed in said plane, wherein the center of mass of the aerial vehicle lies in said plane.

Below are some other preferred versions described without them having an exhaustive effect.

A first preferred mode is a technique in which some of the air that provides the upward propulsion of the multicopter is diverted and used to propel the multicopter without tipping it over. A second way is a method in which an independent source is provided in an additional way that can provide airflow with sufficient force to propel the multicopter without it having to perform a tilting motion.

In the versions as described below, the drive propellers are mounted in a fixed position and the basic operation of the multicopter remains the same as with the existing multicopters. The additional drive as described in the present invention, is an additional control that makes it possible to move the multicopter according to the x- and/or y-direction apart from landing the multicopter or without rolling or pitching the multicopter.

This additional device can work entirely separately and autonomously from the multicopter and therefore can be applied as an add-on. It is however also possible that the device is partially or fully integrated into the multicopter. Additionally, components such as the battery and PCB can be shared and the software can be interactive.

However, there are also versions possible where the drive propellers are arranged rotatably, e.g., to better support the control airflow.

Some embodiments are explained below.

A possible preferred version is a composition in which the multicopter is provided with at least one control airflow of control air produced by the drive propellers, providing the multicopter with the necessary lateral propulsion. The control airflow is preferably used directly via hollow tubes that can also perform the function of suspension arms for the drive propellers. The supplied steering air is provided through at least one opening in the hollow tubes. This control air is pushed via a control valve into the hollow tube in the direction of the suspension arm's opening at the end of this hollow tube. By means of the control valve, the supply of the supplied control air needed via the hollow tube is controlled.

An additional possible preferred version is a composition in which the multicopter is provided with at least one control airflow of control air produced by the drive propellers, providing the multicopter with the necessary lateral propulsion. The control air is preferably used directly via hollow tubes that can also perform the function of suspension arm for the drive propellers. The supplied control air is supplied through at least one opening in the hollow tubes. This control air is pushed via a control valve into the hollow tube in the direction of the suspension arm's opening at the end of this hollow tube. By means of the control valve, the supply of the amount of supplied control air that is needed via the hollow tube is controlled. The hollow tube can send the control air out from two sides, in two directions. One side is to push the steering air out laterally so that the multicopter can be steered. On the other hand, the air is pushed to the central part, and downwards from there, where the steering air supports the upward movement of the multicopter. The control valve controls the ratio of the steering air that is pushed laterally or centrally.

By building up an equal resistance for each propeller regardless of the amount of steering air that is discharged laterally, the multicopter remains in balance during its normal operation.

In addition, valves can be provided that can close the openings in the hollow tubes if no additional control is needed. An additional device can also be made, such as in the form of one or more additional valves on the suspension arm that can increase or decrease the collection surface of the opening in the hollow tubes.

An additional possible preferred version is a composition in which the multicopter is provided with control air flows that are produced by the drive propellers. These control air flows give the multicopter lateral propulsion. The control air is preferably centralized and controlled via a, preferably spherical space that is preferably fixed and equipped with multiple openings to push the air outwards. In line with the opening where the air is pushed out, a hollow tube can be additionally provided to bring the steering air past the drive propellers. These tubes are preferably applied to the x- and y-axes. If the multicopter is a quadcopter, preferably, four hollow tubes are provided and these tubes are positioned at an angle of 90° to each other. These tubes can be additionally fitted but can also have the function of the suspension arm and drive propellers. The supplied control air is supplied through one or more openings in the hollow tubes where the steering air is pushed through a valve in the direction of the central part. If the incoming steering air is pushed in via the same route as the steering air that must flow out, the supplied steering air of the drive propeller is blocked via a valve.

An additional possible preferred version is a composition in which the multicopter is equipped with an extra propeller configured to rotate around an axis perpendicular to the z-axis during rotation, and can provide the multicopter with lateral propulsion. This propeller is freely arranged and rotatable around the z-axis so that the multicopter can be adjusted in the x or y direction or any angle that would lie between them.

An additional possible preferred version is a composition in which the multicopter is equipped with an extra propeller configured to rotate around an axis perpendicular to the z-axis during rotation, and can provide the multicopter with lateral propulsion. This propeller is housed in preferably spherical space and equipped with an opening to bring the sucked air in and an additional opening to guide the propelled air outwards. In line with the opening where the air is pushed out, a hollow tube is provided to bring the air past the drive propellers, away from the center of the multicopter, in order to reduce interference of the airflow by air currents from the propellers. The composite device with the hollow tube is rotatable around the z-axis so that the multicopter can be adjusted in the x- or y-direction or any angle that would lie between them.

An additional possible preferred version is a composition in which the multicopter is equipped with a compressor that can provide the multicopter with lateral propulsion. The compressed air is housed in a preferably spherical space and provided with an opening to guide the compressed air outwards. In line with the opening through which the air is pushed out, a hollow tube can be additionally provided to vent the stowage air, past the drive propellers. The opening is equipped with a shut-off valve, making it possible to use the drive when necessary. The composite device with the hollow tube is rotatable around the z-axis so that the multicopter can be adjusted in the x- or y-direction or any angle that would lie between them.

An additional possible preferred version is a composition in which the multicopter is equipped with a compressor that can provide the multicopter with lateral propulsion.

The compressed air is housed in a preferably spherical space that is fixed and provided with multiple openings to push the compressed air outwards. The openings can be fitted with valves to control the airflow. In line with the opening where the air is pushed out, a hollow tube can be additionally provided to bring the air, preferably past the drive propellers. These tubes are preferably placed on the x and y axis and in the version where four tubes are provided, these tubes are positioned at an angle of 90° to each other. These tubes can be extra fitted tubes but can also consist of the suspension arm with the drive propellers that are made hollow.

An additional possible preferred version is a composition in which the multicopter is equipped with several additional propellers configured to rotate around an axis perpendicular to the z-axis during rotation, and can provide the multicopter with lateral propulsion. These propellers can be set up freely but possibly also housed in preferably spherical space and equipped with at least one opening to bring in the sucked air and several additional openings to guide the propelled air outwards. The openings can be fitted with valves to control the airflow In line with the opening where the air is pushed out, a hollow tube is provided to bring the air preferably to the drive propellers. The composite device with the hollow tube is rotatable around the z-axis so that the multicopter can be adjusted in the x- or y-direction or any angle that would lie between them.

Additional embodiments are versions in which the different methods are combined with each other. A variant of this may be that the multicopter is equipped with finetuning in which part of the propulsion of the propellers is used to allow the multicopter to move since it is supplemented with a pulse system in which the pulse of air comes out of a pressure vessel. By using the supplementary pulse system, more extreme forces on the multicopter can be countered, for instance when firing a flare from the drone.

The principles according to which the present invention operates, offers the following advantages:

It allows the multicopter to move it in a horizontal direction without tilting it.

It can act pulsating, allowing it to absorb strong and sudden movements of the multicopter.

The additional design of the present invention can largely be integrated into the existing concept of the multicopter. As a result, there is hardly any extra weight.

It is suitable for any kind of multicopter.

DESCRIPTION OF THE FIGURES

The following description of the figures of some specific embodiments of the invention is more exemplary in nature and is not intended to describe current teachings, their application or use. In the drawings, corresponding reference numbers indicate similar or related parts and characteristics.

Components

Figures 1, 2, 3:
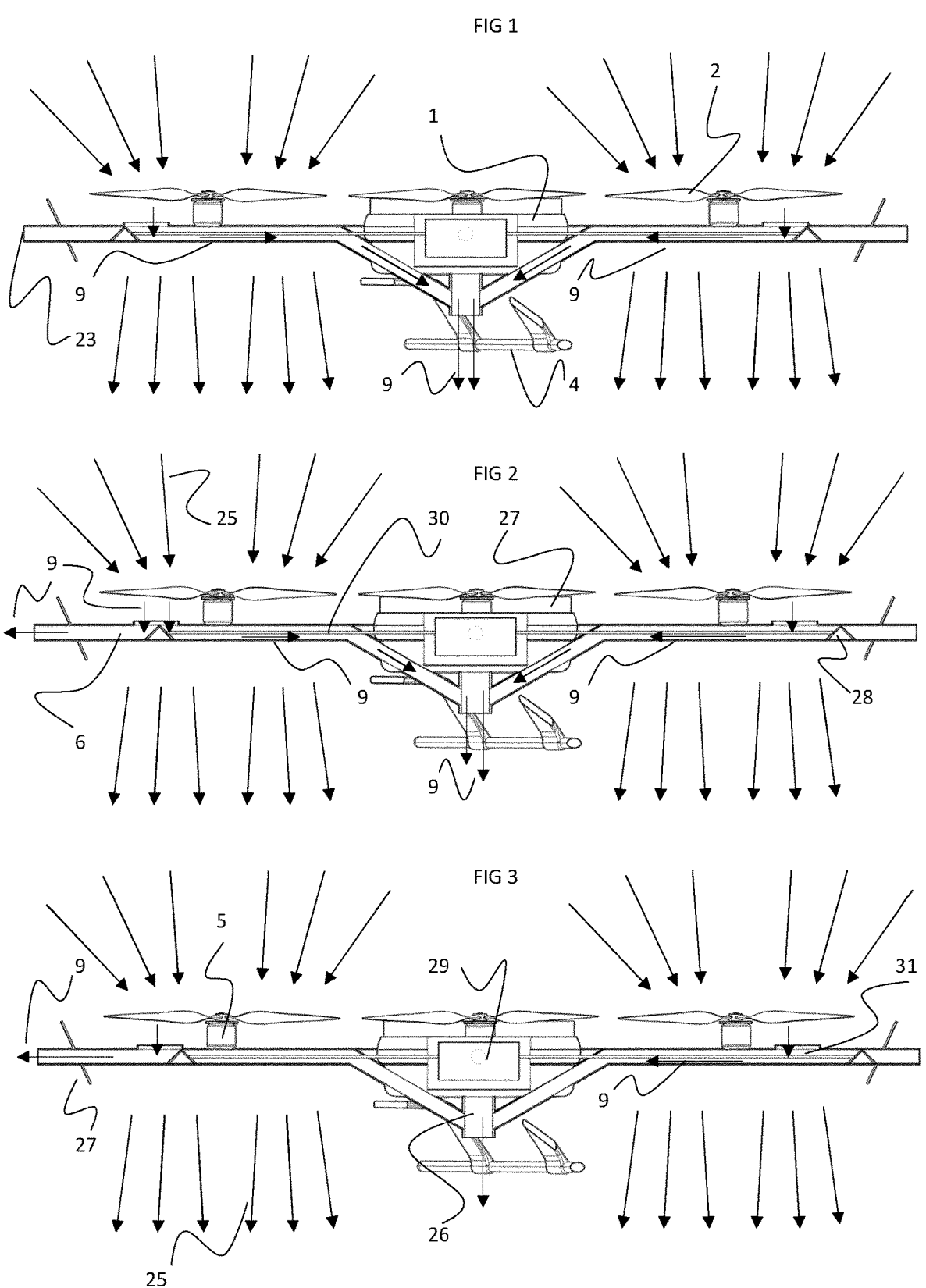
FIG. 1: a cross-section view of the basic representation in perspective of the drive of a quadcopter equipped with a control in which part of the air displacement of the propellers through the openings in the hollow tube is diverted to the center.
FIG. 2: a cross-section view of the basic representation in perspective of a quadcopter equipped with a control in which part of the air displacement of the propellers through the openings in the hollow tube are diverted towards the center. In the case of the hollow tube placed on the left, half of the supplied air is diverted to the side and the other half to the middle.
FIG. 3: a cross-section view of the basic representation in perspective of the drive of a quadcopter equipped with a control in which the hollow right-hand tube is expelling a part of the air displacement of the propellers through the opening in the hollow tube towards the middle. In the case of the hollow tube positioned on the left, the supplied air is diverted to the side of the multicopter.

The following description of the parts of the specific embodiments of the invention is merely exemplary in nature and is not intended to limit current teachings, their application or use.

1. Multicopter or aerial vehicle: this description describes versions for a quadcopter. However, the invention is not limited to this type of multicopter.
2. Drive propeller or rotor: these are the propellers that provide the multicopter with the drive force as it is commonly used
3. Central part: the part located on the axis line of the center of the multicopter
4. Landing gear: the landing gear of the multicopter
5. Electric motor: drives the propellers
6. Suspension arm: the drive propellers are mounted on the suspension arm of the propellers and are preferably hollow. In some embodiments, air is also pushed through this, such as the control airflow, and the suspension arms serve as air ducts or airflow tubes.
7. Central drive device: central generator composed of the components that generate a control airflow 8. Central rotatable container: this is a version in which the central drive device is set up rotating around the Z-axis
9. Control airflow: the airflow that pushes the multicopter in an additional way besides the power generated by the drive propeller
10. Rotating device: this makes it possible to rotate the central drive device, and especially the airflow tubes, around the z-axis
11. Valves central part: these valves control the airflow of the drive device in the central part of the multicopter
12. Valves support arm: these consist of shut-off valves that are preferably arranged at an angle if they are active as a non-return or check valve
13. Hatches: the hatches of the suspension arm are integrated into the suspension arm. In the open position, they shall ensure that at least part of the propelled air from the propulsion propeller enters the suspension arm via the opening therein.
14. Air shields: form a shell around the drive propellers to shield the control airflow from the airflow of the drive propellers. This shell can have different versions, and can range from a simple shield to an entire cover around the propellers.
15. Compressor: supplies the compressed air to provide a control air flow at the time it is needed. Thanks to the compressor, powerful pulsating control air flows can be created.
16. Airflow tubes or air ducts: hollow tubes arranged between the drive propellers and through which the control airflow can be pushed. This can be both pushing and suctioning.
17. Supports: the support for airflow tubes supports the airflow tubes if they are too long to be self-supporting
18. Rotation tubes: are fixed hollow tubes through which the control airflow can be pushed and which able to turn the multicopter around the z-axis
19. Central propeller: in the version where at least 1 propeller is used to generate and/or support the control airflow current, it is preferably centrally positioned.
20. Control valve or deflector element: the valve that is set up at the end of the airflow tubes and/or hollow suspension arm and that can adjust the outgoing control airflow in the desired direction.
21. Direction of rotation: in the version where extra hollow tubes are provided to help the multicopter rotate around its z-axis, it can rotate clock or counterclockwise.
22. Central pressure chamber: in this section, the different air flows come together to build up a certain pressure. In the version where a compressor is used, the compressed air is built up in this section and stored until it is needed.
23. Mouth or outlet: these are the openings in the hollow tube through which the control air can flow in and/or out to allow the multicopter to move without it having to tilt.
24. Solid tube: this is the part of the suspension arm that does not perform the function of a pass-through tube for a control airflow.
25. Drive airflow: this is the airflow generated by the multicopter's propellers
26. Central airflow tube: this pushes down the steering air that is not diverted laterally in a central way
27. Housing: this is the base of the multicopter, which houses the various parts such as the battery, PCB, etc.

28. Control valve or flow director: the valve located in the hollow tube with the function of controlling the control air 29. Valve control: this is the unit that controls the control valves via the arms 30. Steering arm: the steering arm of the valve control is the arm that moves the control valves via the drive device 31. Airflow opening: this opening catches the airflow generated by the propellers 32. Air flow generating means: 32. generates an adjustable and directed airflow through the hollow suspension arm

DETAILED DESCRIPTION OF THE INVENTION

The present invention concerns a drive technique for a multicopter in which the multicopter can be moved without the multicopter having to make a tilting motion.

With the known quadcopters and multicopters in general, it is a known problem that the correct positioning of the multicopter on the landing site is difficult inside and almost impossible in the open air.

The present invention makes it possible for almost all existing multicopters to position very accurately in a shielded environment but also in the open air.

The basic drive of the multicopter is complemented by an additional drive where the multicopter can be propelled without tilting. This additional drive can be generated by using some of the air flow generated by the propellers. This methodology is described in FIGS. 1-8. Another possible drive can be generated by using an additional drive. This methodology is described in FIGS. 9-11

A first preferred version is shown in FIGS. 1, 2 and 3. Part of the drive airflow 25 is used to move the multicopter 1 laterally without tipping it over. The multicopter 1 is equipped with some drive propellers 2 or rotors that provide a drive airflow 25 that serves as a primary propulsion method. This drive airflow 25 provides an upward force that can make the multicopter 1 take off and fly. FIG. 1 shows an arrangement in which part of the drive airflow 25 is diverted to the center via an airflow opening 31 in the hollow suspension arm, and subsequently is expelled from the multicopter 1. This control airflow 9 then also provides an upward force. As a result, the loss of carrying capacity in which part of the drive airflow 25 is absorbed by the airflow openings 31 in the suspension arm is compensated for to a large extent. To move the multicopter 1 laterally, at least part of the control airflow 9 must be pushed through the outlet at the end of the hollow suspension arm 6. FIG. 2 shows an arrangement in which control valve 28 is positioned in the left suspension arm 6 in the middle of the airflow opening 31. As a result, part of the control airflow 9 will be pushed towards the mouth 23 and another part of the control airflow 9 towards the central airflow tube 26. In this version, the control valve 28 in the right suspension arm closes the outlet or mouth 23, sending the entire control airflow 9 towards central airflow tube 26. The result of this arrangement is that the multicopter 1 is pushed to the right. By moving the control valve 28 to the left or right, the amount of control airflow 9 that is pushed out of the mouth 23 can be controlled and thus the speed at which the multicopter 1 is propelled to the right can be determined.

FIG. 3 shows an arrangement in which control valve 28 is positioned on the far right so that the entire control airflow 9 that ends up in the hollow tube through the airflow opening 31 is pushed out through the mouth 23. The propulsion via the right suspension arm 6 is maximized in this arrangement.

In the setup as illustrated in FIGS. 1, 2 and 3, control valve 28 per suspension arm 6 is controlled by the steering arm 30, this steering arm forms the connection between the control valve 28 and the centrally located valve control 29. This valve control 29 moves the steering arm 30, which in turn drives control valve 28. In this specific version, the steering arm 30 is made up of one piece and runs from the left control valve 28 to the right control valve 28. When moving the steering arm 30, the control valves 28 remain at the same distance from each other. This is the case with this version but is not necessary for proper functioning. The system can also work if valve control 29 controls each control valve separately. On the end of suspension arm 6 an air shield 14 is provided. This can be added to the multicopter 1. This air shield 14 absorbs the suction effect, known as the venturi effect, of the drive airflow 25. Air shield 14 therefore aims to shield control airflow 9 that comes out of the mouth 23 from the venturi effect generated by the drive airflow 25.

The middle of the multicopter 1 is equipped with a central airflow tube 26. This is to prevent the drive forces generated by drive propeller 2 from being disrupted in an unbalanced manner and thus disrupting the operation of multicopter 1. The central airflow tube 26 is positioned between the landing gear 4. If the space between the landing gear 4 is occupied by, for example, a package, this control airflow 9 can be guided around this package. The central airflow tube 26 is an optional feature.

The arrangement as shown in FIGS. 1, 2 and 3 can possibly be supplemented with an additional drive, for example in the shape of an air compressor that can generate additional air flows on demand, that supports control airflow 9 if, for example, a short pulse of extra force is needed.

Figure 4:
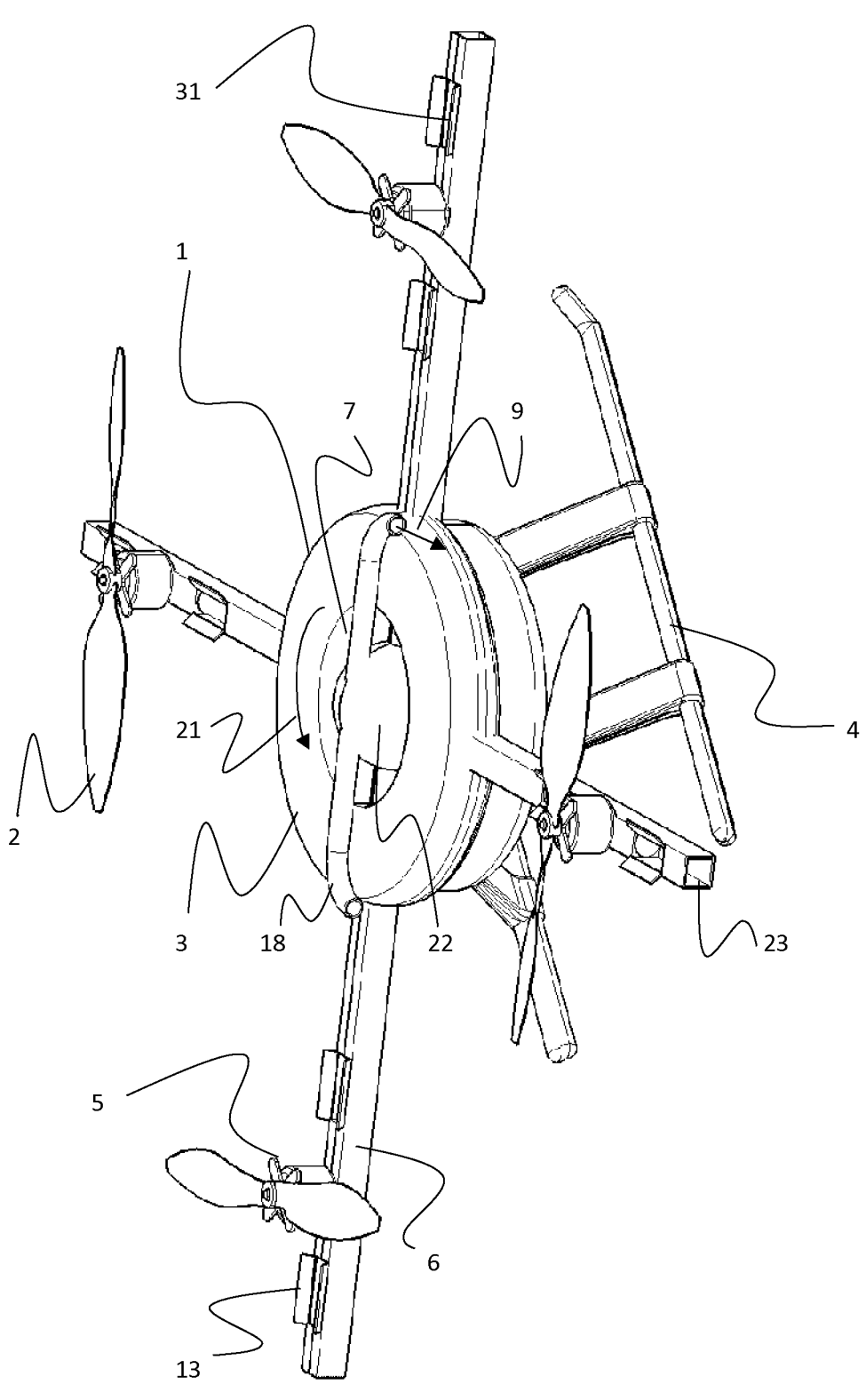
FIG. 4: view in perspective of a quadcopter equipped with a centrally located drive where the suspension arm is part of the lateral drive

A second preferred version is shown in FIG. 4. This shows a multicopter 1 in the form of a quadcopter in perspective. The quadcopter 1 is equipped with a drive in x- and/or y-direction that is integrated in the suspension arms 6 of the drive propellers 2. These suspension arms 6 are hollow inside and the electric motors 5 that drives the drive propellers 2 are arranged in such a way that they do not impede the free flow of control airflow 9. Centrally located is central drive device 7. This is composed of a central pressure chamber 22 and valves 11 that control the air flows. In the setup according to FIG. 4, the central drive device 7 is also equipped with rotation tubes 18. The rotation tubes 18 depart from the central pressure chamber 22 and can be equipped with a control airflow 9 via the valves 11. These rotation tubes 18 are offset with respect to the z-axis through the center of mass of the multicopter 1, such that air flow from the rotation tubes provides for a rotational impulse to the multicopter 1. In this setup, only one of the two rotation tubes 18 can be provided with a control airflow 9 at any given time. The purpose of these rotation tubes 18 is to allow the multicopter 1 to rotate around its z-axis. This is entirely powered by the control airflow 9 which is generated by the rotation of the drive propellers 2. The two rotation tubes 18 are arranged in opposite directions. It is therefore advisable to provide only one of the two rotation tubes 18 with a control airflow 9 to obtain optimal efficiency. In this version, control airflow 9 is generated by drive propeller 2 but this could also be via another drive such as a central propeller 19, or an independent source, such as a compressor.

In this embodiment, multicopter 1 is pushed counterclockwise 21 around the z-axis by control airflow 9. Control airflow 9 comes from the central pressure chamber 22, which receives his pressure air from the four drive propellers 2 through the openings 31. Via the valves 13 in the suspension arms 6, a part of the air that is propelled by drive propeller 2 is directed to the central part 3. To prevent the air entering through one of the openings 31 from escaping back through another airflow opening 31, valves 12 are provided in the suspension arm 6 that block the part between the valves 31 and mouth 23 and push the control airflow 9 towards central part 3. These valves 12 are preferably arranged at an angle so that the air is directed as smoothly as possible to the center. This version is with two openings 31 per suspension arm 6, but this can just as well be only one per suspension arm 6 or more than two.

To control outgoing control airflows 9, the hatches 13 on the suspension arms 6 can be opened and closed. The positions of the hatches 13 can be adjusted steplessly between maximum open and closed. These are therefore dependent on the control of the multicopter 1 and where control airflow 9 must perform its driving force at that moment. That the opening of the hatches 13 takes away a small part of the power of drive propellers 2 is not critical because multicopter 1 does not need its full power because the adjustment will mainly be used when landing the multicopter 1.

Also, multiple exits 23 can be combined for both incoming and outgoing airflows 9.

Figure 5:
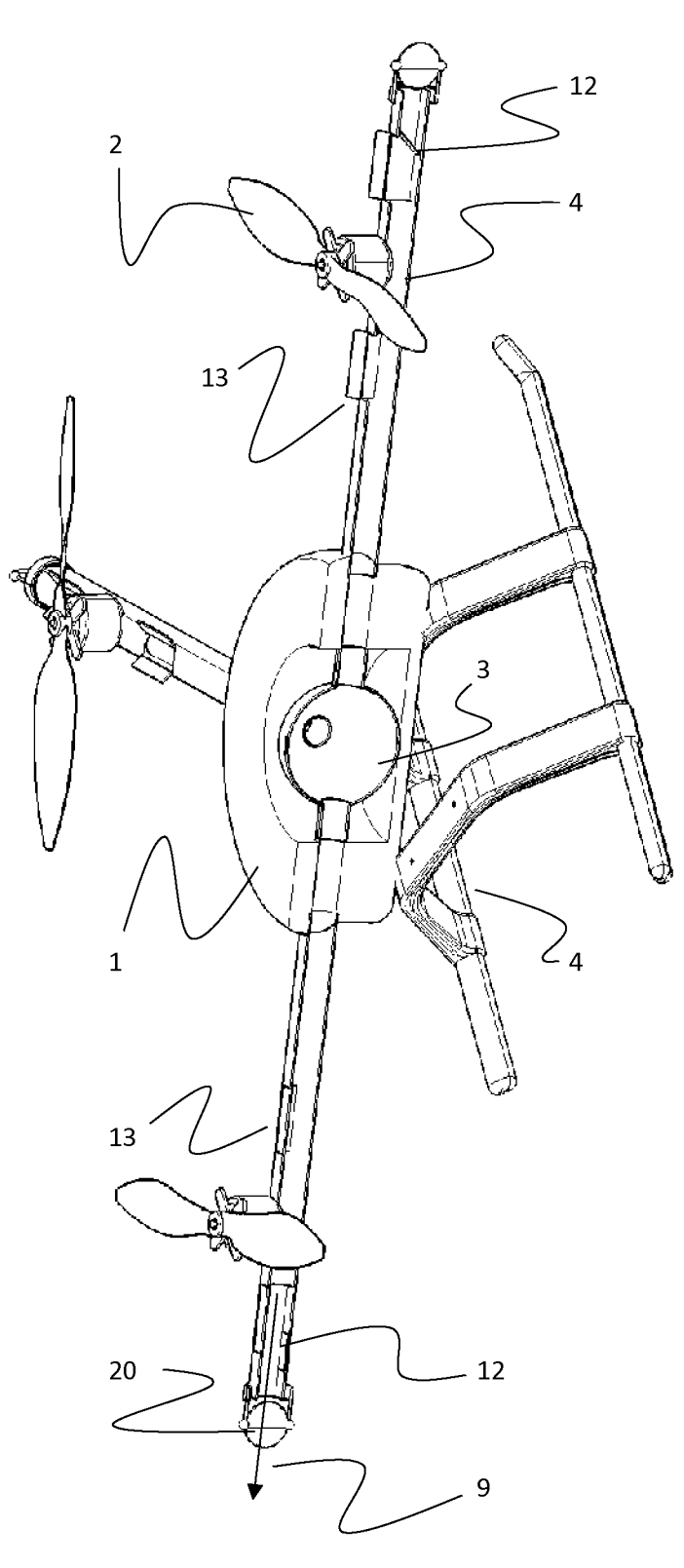
FIG. 5: a partial cross-section view in perspective of a quadcopter equipped with a centrally located drive where the suspension arm is part of the lateral drive

FIG. 5 shows a version similar to FIG. 4 with the difference that no central airflow tubes 16 are provided here, and a control valve 20 positioned at the exit of the mouth 23 at the end of the suspension arm 6. This control valve 20 is configured for controlling outgoing control airflow 9. This adjustment can be in the XY plane of as well as according to the Z-axis, meaning that the control valve 20 can be provided rotatably around an axis parallel to the Z-axis, but may also be provided rotatably around an axis parallel to the X- or Y-axis (or an intermediate position, depending on how the axes are chosen). The function of airflow tube 16, to rotate multicopter 1 around the Z-axis, as shown in FIG. 4, is taken over by control valve 20 in the version of FIG. 5.

Figure 7:
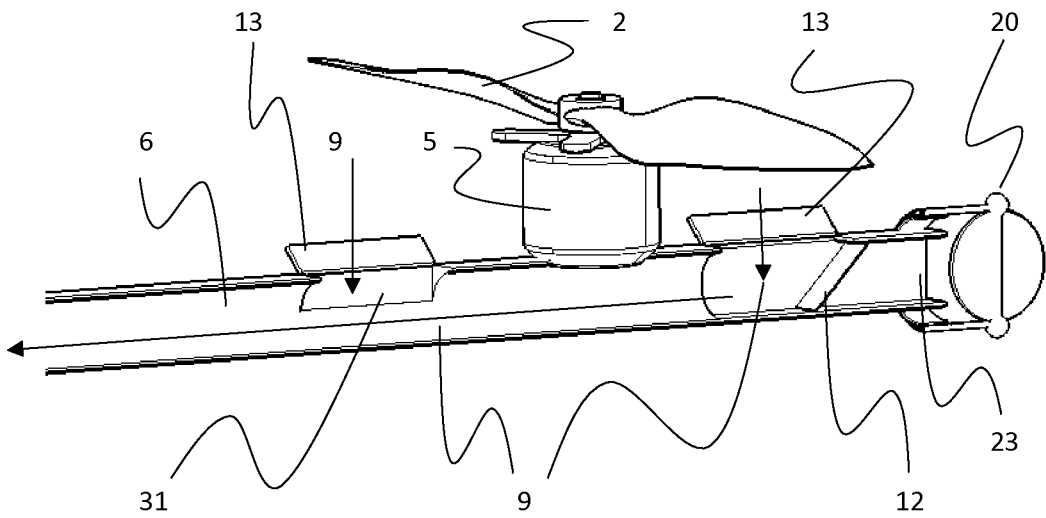
FIG. 7: a detailed view in perspective of the suspension arm of the quadcopter with a partial cross-section where the hatches are set up in an open position.
Figure 8:
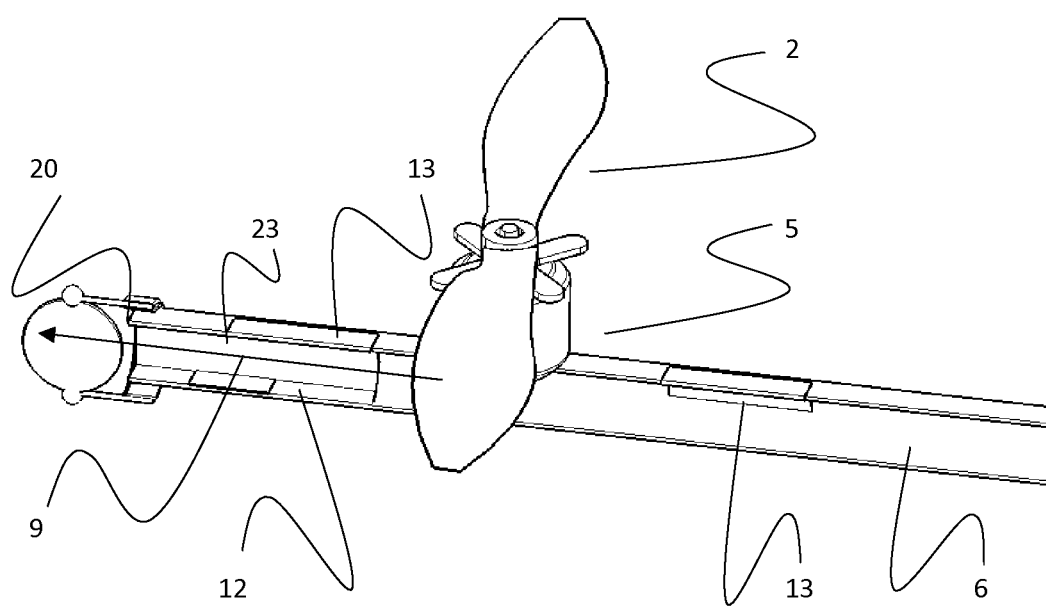
FIG. 8: a detailed view in perspective of the suspension arm of the quadcopter with a partial cross-section where the hatches are positioned in a closed position.

A detail of the function of the suspension arm, as described above, is shown in FIGS. 7 and 8. In FIG. 7, the suspension arm 6 is shown in a state where the control airflow 9 is brought in via the opening 31 and pushed to the central part. FIG. 8 shows a state in which the hatches 13 are closed. In this condition, the control airflow 9 comes from the center and flows through the suspension arm 6 to push the multicopter 1 in the desired direction. In this embodiment, the suspension arm 6 doubles as an air duct or airflow tube 16.

Figure 6:
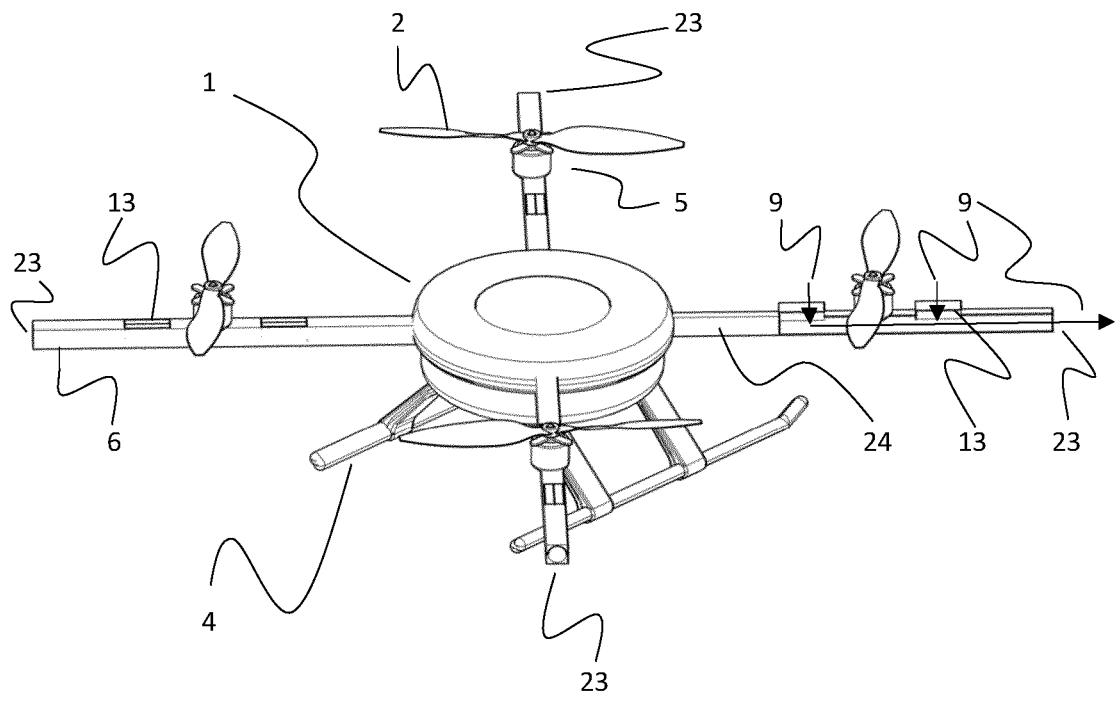
FIG. 6: a partial cross-section view in perspective of a quadcopter where the suspension arm is part of the lateral drive

The version according to FIG. 6 shows a simplified version of the versions as shown in FIGS. 1 and 2.

In this version, no central part 3 is used but the air from the drive propeller 2 is sent directly to mouth 23. FIG. 6 shows three suspension arms 6 where the hatches 13 are closed. This means that no control airflows 9 are pushed out through the mouth 23 via the suspension arm 6. With one suspension arm 6, the hatches 13 are open and the air of the suspension arm 6 can therefore be used as control airflow 9 in a direct way. The part of suspension arm 6 that is located between hatch 13 that is positioned closest to the multicopter 1 and multicopter 1 is a solid tube 24, which means that no air can pass through this part. In this version, there are four possible lateral drive points that can be activated by opening the respective hatches 13 of the suspension arm 6. The position of the hatches 13 determines the amount of control airflow 9 that can be generated.

The hatches 13 in suspension arm 6 can have two functions, reducing the power of the airflow of drive propellers 2 and adjusting the position of multicopter 1.

Figure 9:
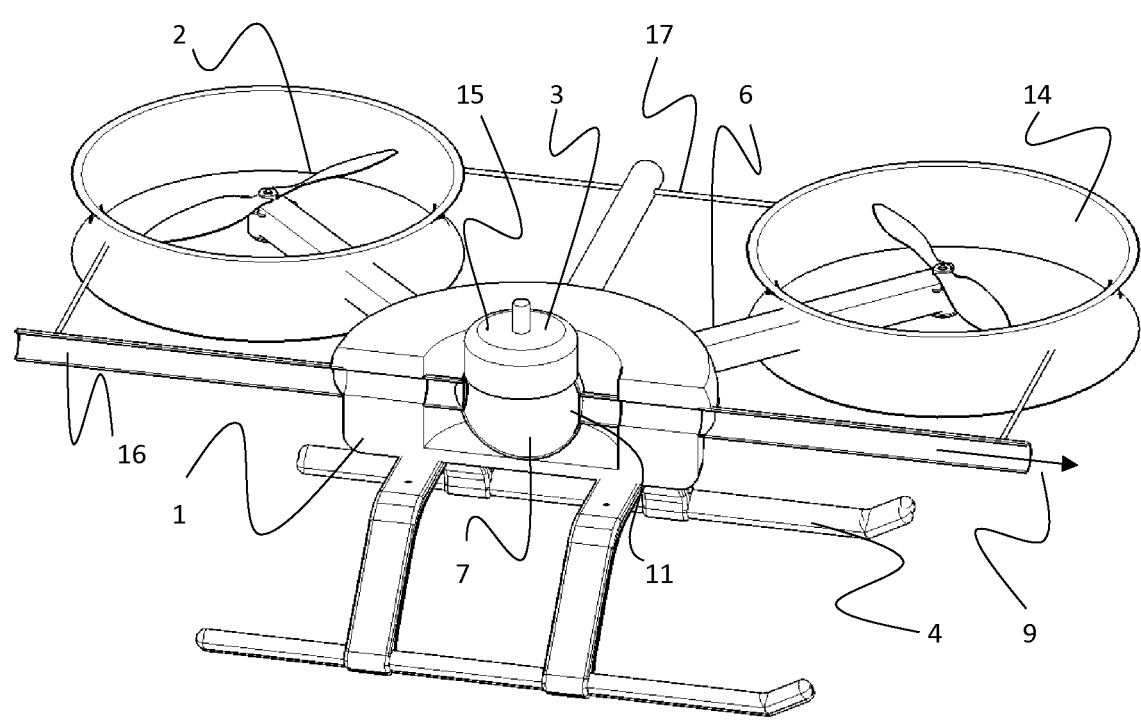
FIG. 9: partial cross-section view in perspective of a quadcopter equipped with a centrally located drive equipped with a compressor where separate airflow tubes are part of the lateral drive.

An additional embodiment is shown in FIG. 9. Multicopter 1 is equipped with a central part 3 composed of a central pressure chamber 22 equipped with a compressor 15. In this central pressure chamber 22, there is at least one valve 11 on each output that can control the outgoing control airflow 9 between maximum and minimum. On each of the four outputs 23, there is an airflow tube 16 provided. These airflow tubes 16 guide the control airflow 9 beyond the drive propellers 2. To ensure that the airflow of the drive propellers 2 exerts little or no influence on control airflow 9 that comes out of the airflow tubes 16, air shields 14 are mounted around the drive propellers 2 in the shape of a shell. The airflow tubes 16 are supported by supports 17 that are attached to the air shields 14.

Figure 10:
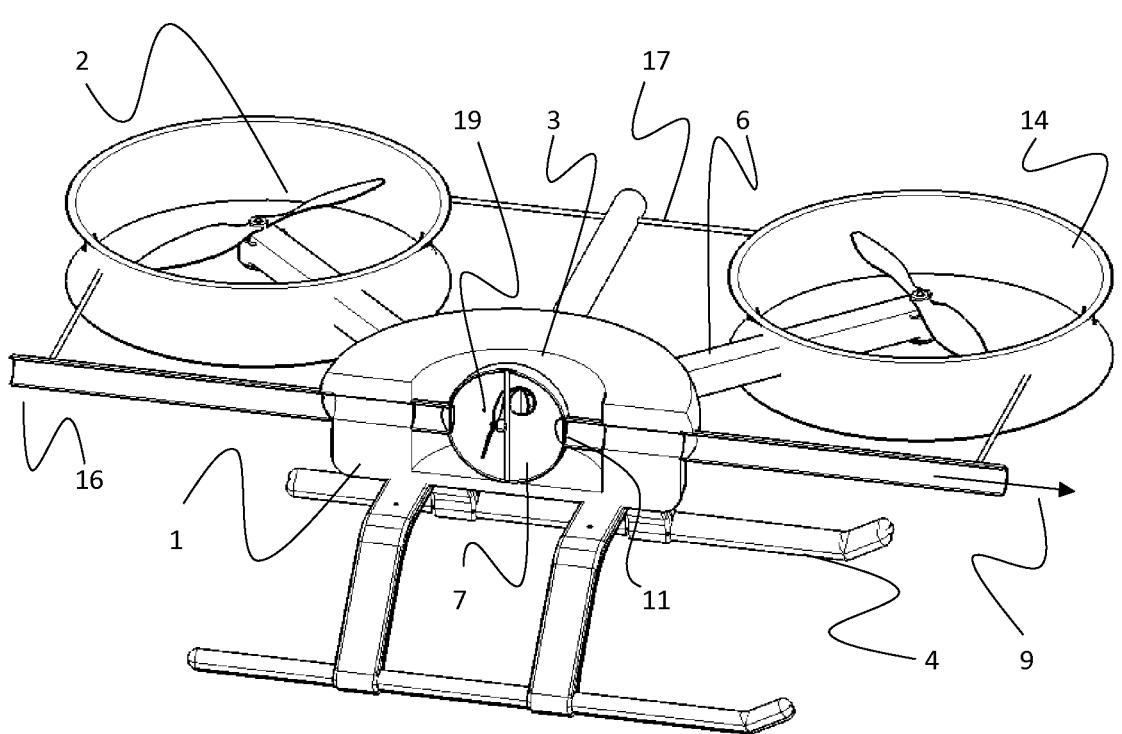
FIG. 10: partial cross-section view in perspective of a quadcopter equipped with a centrally located drive which comprises a propeller therein, where separate airflow tubes are part of the lateral drive, instead of being comprised in the suspension arms for the propellers.

With an alternative embodiment, the control airflow 9 is produced by a central propeller 19. The version as shown in FIG. 10 is very similar to that shown in FIG. 9. The difference is that the source for the control airflow 9 is not a compressor 15 but a centrally located propeller 19. This central propeller 19 will suck in the air via at least one of the airflow tubes 16 and drive the control airflow 9 through at least one of the airflow tubes 16.

In an alternative version, the supplied air can be drawn in through a central opening in central pressure chamber 22.

Advantages of the version as in FIG. 9 compared to the version as in FIG. 10

Pulsating control airflows 9 is easy to generate

Accurate and instantaneous control over the control airflows 9, with a wide range in power possible, allowing very dynamic reactions to every situation Control airflows 9 can be short and powerful Control airflows 9 can be easily distributed over different airflow tubes Advantages of the version as in FIG. 10 compared to the version as in FIG. 9

Control airflow 9 can be constant and persist for a long time

Both the aspirated and the propelled air can be used to adjust multicopter 1

In one of the previous versions, central part 3 is provided by a central propeller 19, this can be several central propellers 19. An alternative version can consist of a central propeller as well as one or more propellers per suspension arm 6 or airflow tubes 16.

Figure 11:
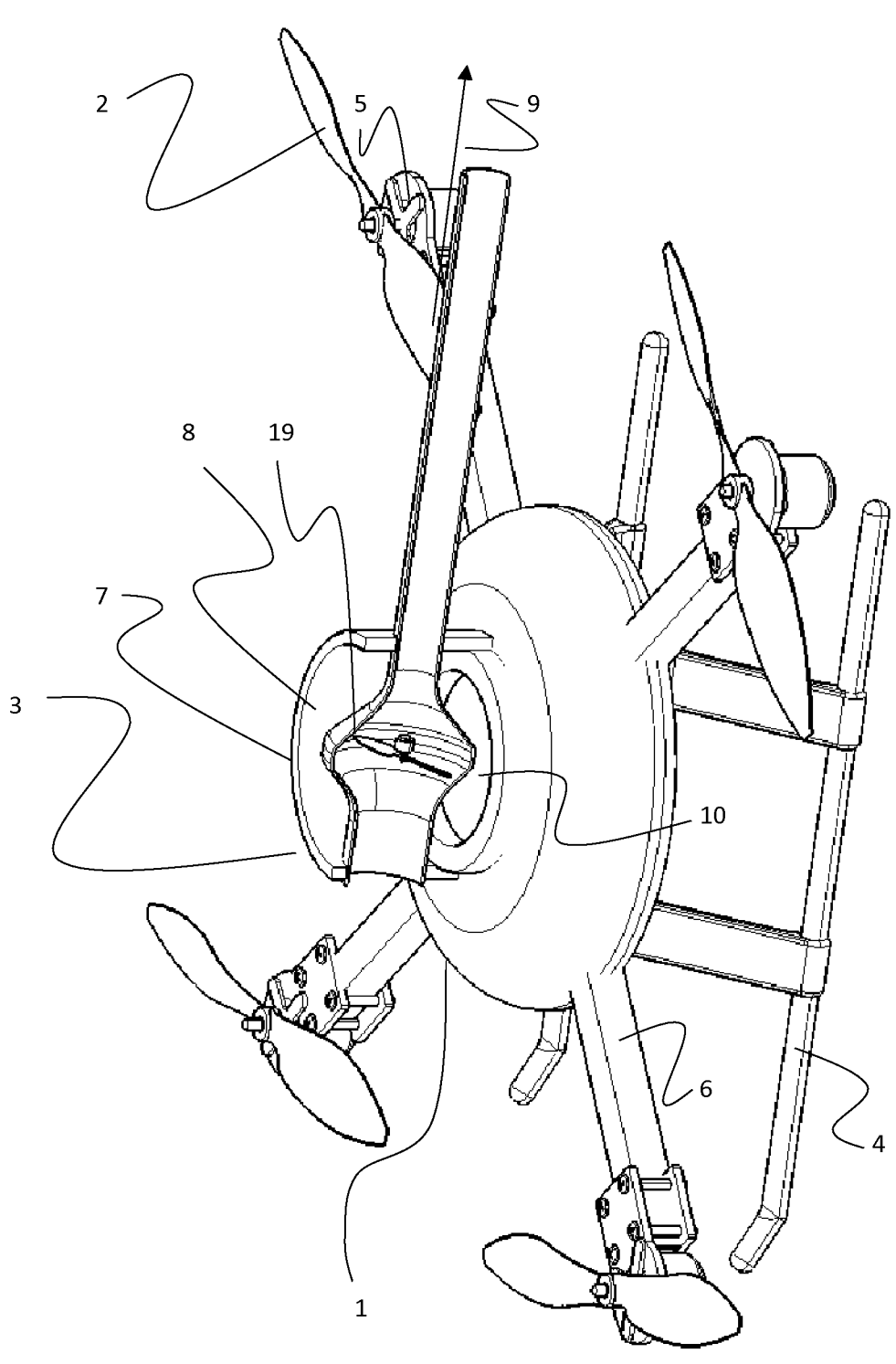
FIG. 11: partial cross-section view in perspective of a quadcopter equipped with a centrally located drive which comprises a propeller therein, where a rotatable control tube is provided centrally.

FIG. 11 shows an additional alternative embodiment in which central part 3 consists of a central rotatable container 8 that is arranged rotating. The central rotatable container 8 includes a central propeller 19 that can rotate 10 180° via a rotating device. In this central rotatable container 8, a central propeller 19 is placed that generates control airflow 9. The control airflows 9 are brought past the drive propellers 2 via the airflow tubes 16. The central rotatable container 8 can be positioned both above and below the drive propellers 2.

Figure 12:
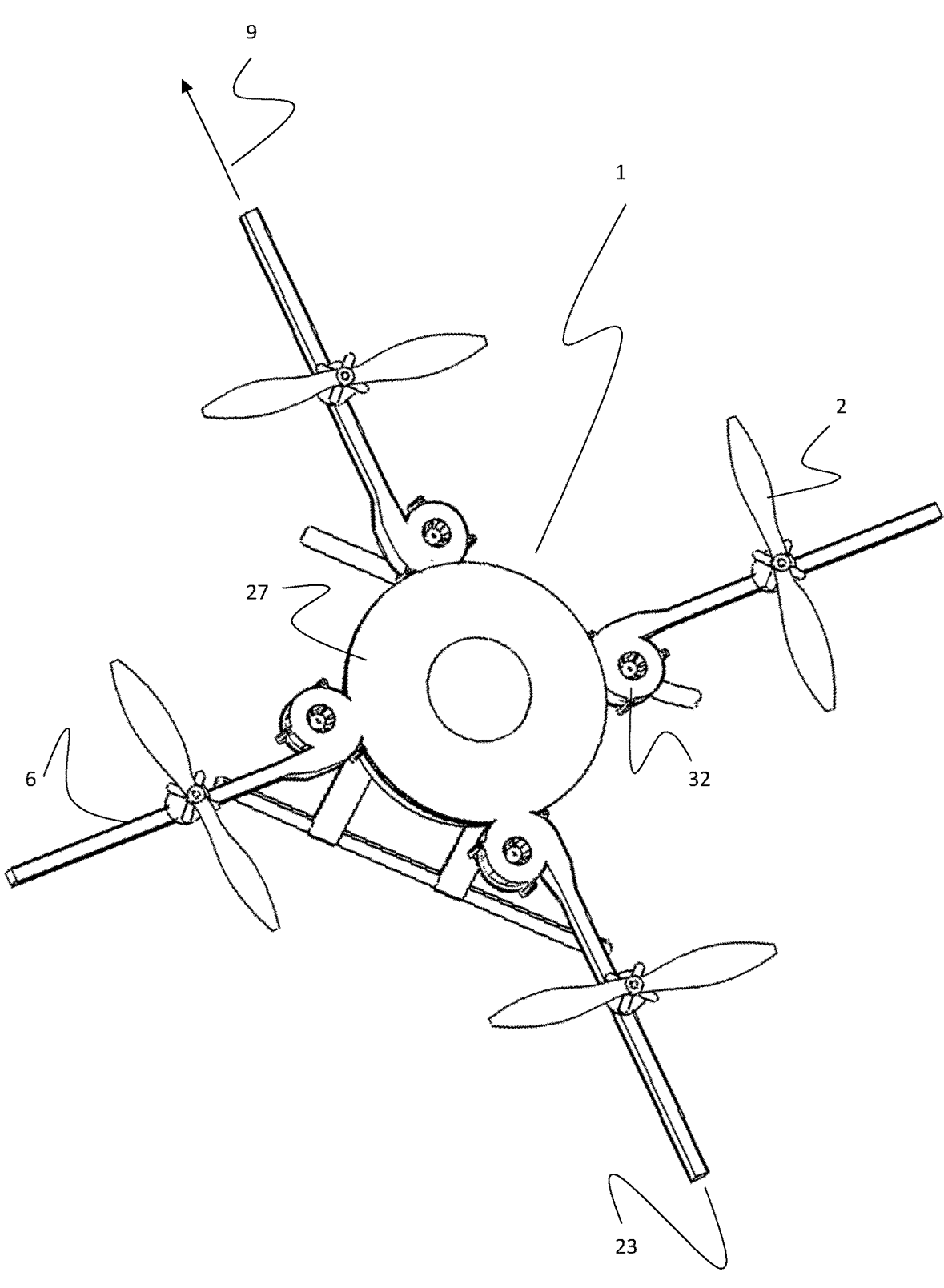
FIG. 12: view in perspective of a quadcopter equipped with 4 air flow generating means to generate a control airflow

FIG. 12 shows an additional preferred version where the lateral propulsion of the multicopter 1 is generated without tilting by using a laterally aimed control airflow 9 where the control airflow 9 is generated by an air flow generating means 32, in this case in the form of a propeller or turbine. The strength of the control airflow 9 can be controlled by controlling the propeller/turbine 32. The propeller/turbine 32 generates a control airflow 9 that departs from the propeller/turbine 32 and flows out via the suspension arm 6 and outlet 23. Depending on the desired direction, one or more propellers/turbines 32 can be activated. Multicopter 1 can be controlled by only the drive propellers 2 or by a combination of the drive propellers 2 and one or more turbines 32. Practice shows that mainly air flow generating means based on turbine technology where, for example, a centrifugal pump principle is used to suck in, compress and propel the necessary air via a suspension arm 6 to make the drone move sideways without tilting the drone, work most efficiently.

Other means for generating an air flow are of course possible as well, outside of turbines and propellers, such as an air pump, etc. Preferably however, use is made of compressed air to ensure sufficient propulsion.

The invention claimed is:

1. An aerial vehicle, that is unmanned, comprising: a vehicle body; optionally a landing gear attached to said vehicle body; one or more propulsions systems for moving the aerial vehicle, said propulsion systems comprising at least one rotor; and a processing unit comprised in the vehicle body for controlling the propulsion systems; characterized in that the aerial vehicle further comprises one or more corrective propulsion systems for providing directional impulses to the aerial vehicle during flight, said corrective propulsion systems comprising one or more hollow air ducts, said air ducts having an outlet aimed essentially lateral to the vehicle body directly away from the center of mass of the aerial vehicle, whereby the processing unit is adapted for controlling the corrective propulsion systems separately to emit a propulsive air stream from the outlet, whereby the rotors of the propulsion systems are provided on the air ducts; wherein each hollow air duct extends at least partly over a position directly below or above one of the rotors, and wherein the hollow air ducts comprise one or more openings at said position directly below or above one or more of the rotors at the side of the hollow air duct facing the rotor, said opening directed perpendicular to the plane wherein said rotor is configured to rotate, and wherein the processing unit is configured for allowing or disallowing an air flow to run from the opening out of the outlet.

2. The aerial vehicle according to claim 1, wherein at least one air duct comprises two openings, a first opening more distal from the vehicle body than the rotor directly above or below the air duct, and a second opening more proximal to the vehicle body than the rotor directly above or below the air duct.

3. The aerial vehicle according to claim 1, wherein the openings are closed via a closing mechanism that is controlled via the processing unit, for closing and opening the openings.

4. The aerial vehicle according to claim 1, wherein the hollow air ducts are provided with an internal closing mechanism inside of the hollow air duct, said internal closing mechanism being controlled via the processing unit for closing and opening a passage from the opening to the outlet.

5. The aerial vehicle according to claim 1, wherein the corrective propulsion system comprises at least one movable flow director provided in each of the air ducts, said flow director movable along the longitudinal dimension of the air duct between a first position in between the opening of the air duct and the outlet of the air duct, and a second position not between the opening of the air duct and the outlet of the air duct, said second position being more proximal to the center of the aerial vehicle, wherein said flow director is dimensioned to substantially seal the air duct internally at the position of said flow director.

6. The aerial vehicle according to claim 5, wherein at least two air ducts are directed with the outlet in opposite directions with respect to each other, wherein the flow directors of said at least two air ducts are coupled such that movement of a first of said flow directors of said at least two air ducts towards the first position thereof is accompanied by movement of a second of said flow directions of said at least two air ducts towards the second position thereof and vice versa.

7. The aerial vehicle according to claim 5, wherein the air flow director comprises a ramped surface facing away from the outlet, said ramped surface ramping up towards the side of the air duct where the opening is positioned.

8. The aerial vehicle according to claim 1, wherein the corrective propulsion systems comprise an air compressor, controlled by the processing unit, said air compressor configured to generate an air flow through the hollow air ducts towards the outlet thereof, said compressor positioned centrally at the vehicle body.

9. The aerial vehicle according to claim 1, wherein the propulsion systems are positioned on the hollow air ducts.

10. The aerial vehicle, according to claim 1, wherein the corrective propulsion systems comprise one or more flow generating means for generating an air flow through the hollow air ducts towards the outlet thereof, said turbine being positioned centrally at the vehicle body.

11. The aerial vehicle according to claim 1, wherein the hollow air ducts are provided with deflector elements at the outlets thereof, said deflector elements being rotatable around an axis perpendicular to the longitudinal axis of the hollow air duct, and wherein the rotational position of the deflector elements is controllable via the processing unit.

12. The aerial vehicle according to claim 1, wherein the one or more hollow air ducts are rotatable in the horizontal plane of the aerial vehicle, said rotation being controlled by the processing unit.

13. The aerial vehicle according to claim 1, wherein the outlet of the air ducts is directed parallel to the plane wherein the rotors are configured to rotate.

14. The aerial vehicle according to claim 1, wherein the air ducts comprise a secondary outlet, said secondary outlet being directed downward with respect to the vehicle body, away from the rotors, wherein at least two or more of the air ducts converge to a central airflow tube at which central duct the secondary outlet of the ducts is positioned, wherein said central airflow tube is positioned below the center of the vehicle body.

15. The aerial vehicle according to claim 1, comprising at least two rotation tubes for generating a rotational impulse to the aerial vehicle, each rotation tube with a rotation outlet extending in a direction parallel to the plane wherein the rotors are configured to rotate, and wherein said directions wherein the rotation outlets extend are positioned with an offset to an axis perpendicular to the plane wherein the rotors are configured to rotate, said axis through the center of mass of the aerial vehicle, and wherein said directions of the rotation tubes are directed in a different rotational direction with respect to said axis, whereby the processing unit is adapted for controlling the corrective propulsion systems separately to emit a rotationally propulsive air stream from one of the rotation outlets, wherein said rotation outlets extend tangentially to a cylinder around said axis, facing clockwise and counterclockwise respectively with respect to said axis.

16. The aerial vehicle according to claim 1, wherein the air ducts are positioned in a plane parallel to the rotors with the outlets thereof being directed in said plane, wherein the center of mass of the aerial vehicle lies in said plane.

* * * * *